United States Patent
Bomhardt

(10) Patent No.: US 9,753,748 B2
(45) Date of Patent: Sep. 5, 2017

(54) FIRST TOUCH CONFIGURATION

(71) Applicant: SAP SE, Walldorf (DE)

(72) Inventor: Christian Bomhardt, Ettlingen (DE)

(73) Assignee: SAP SE, Walldorf (DE)

( * ) Notice: Subject to any disclaimer, the term of this patent is extended or adjusted under 35 U.S.C. 154(b) by 535 days.

(21) Appl. No.: 13/660,674

(22) Filed: Oct. 25, 2012

(65) Prior Publication Data
US 2014/0122444 A1 May 1, 2014

(51) Int. Cl.
*G06F 9/445* (2006.01)
*G06F 9/44* (2006.01)

(52) U.S. Cl.
CPC ............ *G06F 9/44505* (2013.01); *G06F 8/71* (2013.01)

(58) Field of Classification Search
CPC .. G06F 8/60–8/68; G06F 8/71; G06F 9/4446; G06F 9/44505
See application file for complete search history.

(56) References Cited

U.S. PATENT DOCUMENTS

| | | | |
|---|---|---|---|
| 5,115,501 A * | 5/1992 | Kerr | G06F 9/4446 |
| 5,960,204 A * | 9/1999 | Yinger et al. | 717/176 |
| 6,697,837 B1 * | 2/2004 | Rodov | C07K 14/47 709/203 |
| 2006/0107219 A1 * | 5/2006 | Ahya et al. | 715/745 |

OTHER PUBLICATIONS

"How to Install Windows 2000 Professional," Microsoft KnowledgeBase, May 7, 2007 (http://support.microsoft.com/kb/304868).*
"How to Install Windows 2000 Professional," Microsoft Knowledge Base, May, 7 2007 (Hereinafter "Windows 2000") (http://support.microsoft.com/kb/304868).*

* cited by examiner

*Primary Examiner* — Brian W Wathen
(74) *Attorney, Agent, or Firm* — Jones Day

(57) ABSTRACT

A method of customization of software configuration includes generating and saving user information relating software features, when the software features are requested by a user for the first time. The computer system executes instructions to allow the user to input and adjust the user information. The user information is reviewed and adjustments to configurations of the software features based on the saved user information. Then, the computer system executes the software features requested by the user, according to the implemented adjustments to the configurations of the software features.

20 Claims, 5 Drawing Sheets

Learning Mode – Screen A
Please Configure Settings! Mandatory settings need to be set in order to use Screen A

| Mandatory | Setting | Status |
|---|---|---|
| Yes | Chart of Accounts | Unset |
| No | Approval Settings | Configured |
| No | Payment Terms | Unset |
| No | Payment Methods | Unset |
| Yes | Inventory Management | Configured |

300

100

200

Learning Mode – Screen A

Please Configure Settings! Mandatory settings need to be set in order to use Screen A

| Mandatory | Setting | Status |
| --- | --- | --- |
| Yes | Chart of Accounts | Unset |
| No | Approval Settings | Configured |
| No | Payment Terms | Unset |
| No | Payment Methods | Unset |
| Yes | Inventory Management | Configured |

FIG. 3
300

Review Mode – Screen A

Please check and confirm the configuration of Screen A as adjusted in Learning Mode. Click -> here to return to Learning Mode, to make changes.

The following functionalities were not used during Learning Mode. Please confirm that the following functionalities will be turned off:

Logistics and Warehousing
        Off – completely
    Financials
        Petty Cash The following settings were learned during Learning Mode. Please confirm:

Chart of Accounts
    Approval Settings
    Inventory Management

FIRST TOUCH CONFIGURATION

BACKGROUND

The present disclosure generally relates to user customization of settings in software.

The configurations of various software, for example in business software, may include for example, settings, that affect features in the operations of the software. The more complex the software, the more settings there are. Additionally, each setting within each software may correlate to other settings. Thus, the settings need to be consistent, or otherwise, the conflicting settings may render the software not operable as intended. The correlated groups of settings may also be considered as a part of the configuration.

A business software may be used by different functional groups within a specific business entity, with each functional group performing different tasks handling different data with different objectives for the same business entity. Some data may be used by more than one functional group. For example, a sales department may generate and track sales figures, which may be used by management or marketing groups to track and project revenues, or the sales department may also generate and track inventory numbers, which would be used by warehousing or factories to determine what to manufacture and where to ship which product.

Thus, it is useful for each functional group or even individuals with unique and specialized business functions to have their own customized configurations for a business software that is used within a business entity. Individual group or user customized configurations would naturally allow the different functional groups or users to access the business data and software features most relevant to their work, while reducing the irrelevant or unused data and software features. Pre-built software configurations are costly and limited, and thus cannot anticipate all of the possible specific business function needs. Most software, especially business software, may have an enormous number of settings and other configurations. Thus, a typical user would not be able to set up a business software for the user's specific desired needs without expert help or significant training.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 3 illustrates an exemplary view of a learning mode.

FIG. 4 illustrates an exemplary view of a review mode.

DETAILED DESCRIPTION

The present disclosure, through one or more of its various aspects, embodiments and/or specific features or sub-components, is thus intended to bring out one or more of the advantages as specifically noted below.

Figure 1:
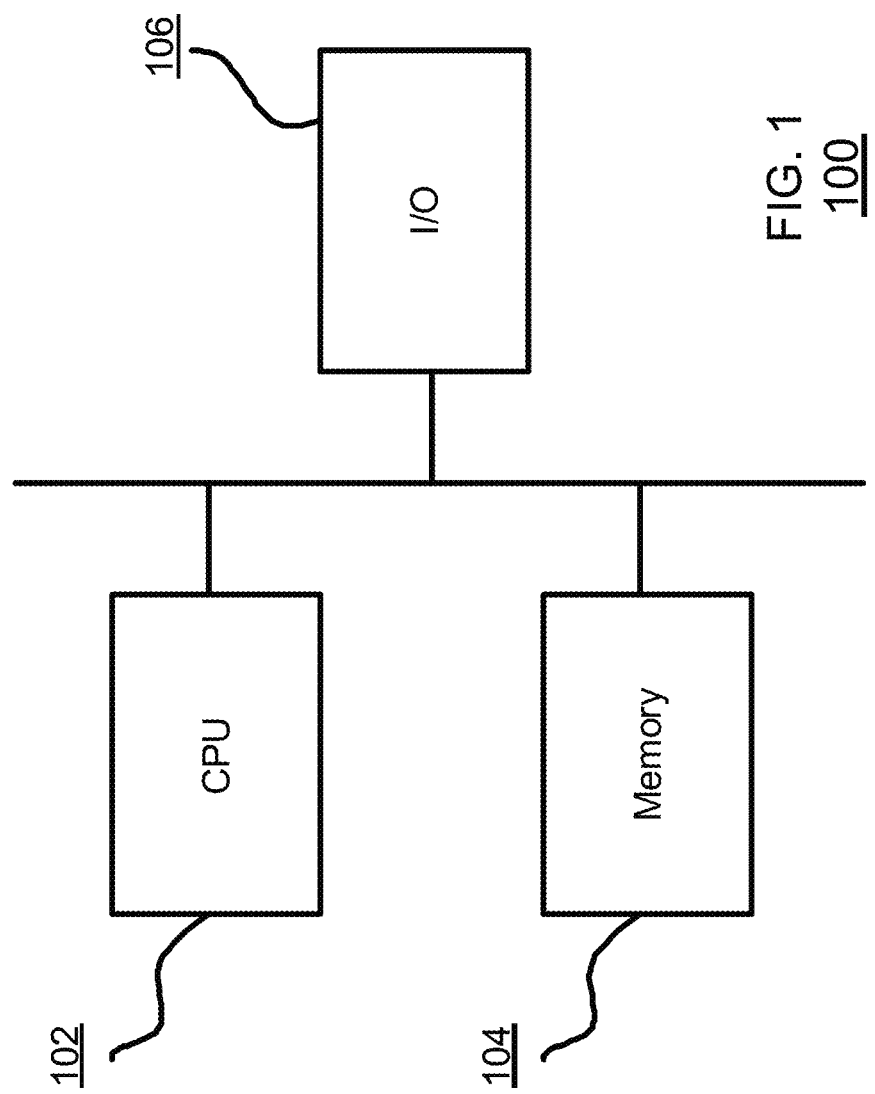
FIG. 1 illustrates an exemplary system implementing the automated customization of software configurations.

FIG. 1 is an exemplary system implementing the automated customization of software configurations. The computer system 100 is generally shown and may include a Central Processing Unit (CPU) 102, which is generally indicated. The CPU 102 may include one or more processing cores, and may be included within, any one or more computers, servers, systems, communication networks or cloud environment. The computer system 100 may further include a memory 104 and an I/O 106, which are connected to the CPU 102.

The memory 104 may include a static memory, a dynamic memory, or both. The memory 104 may additionally or alternatively include a hard disk, random access memory, a cache, a computer-readable medium storing instructions for execution in the computer system 100, or any combination thereof. Of course, those skilled in the art appreciate that the memory 104 may comprise any combination of known memories or a single storage.

The I/O 106 may include, but is not limited to, a network interface, a communication port, a keyboard, a mouse, a scanner, a microphone, a camera, an external memory device, a location or orientation sensor, a temperature sensor, a speaker, an audio output, a video output, a remote control output, any other device or components capable of transmitting or receiving data, or any combination thereof.

The computer system 100, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 100 is illustrated, addition embodiments may include any collection of systems or sub-systems that individually or jointly execute instructions or perform functions.

The computer system 100 may be in communication with one or more additional computer a network, which may be, but is not limited to, a local area network, a wide area network, the Internet, a telephony network, or any other network commonly known and understood in the art.

Of course, those skilled in the art appreciate that the above-listed components of the computer system 100 are merely meant to be exemplary and are not intended to be exhaustive and/or inclusive. Furthermore, the examples of the components listed above are also meant to be exemplary and similarly are not meant to be exhaustive and/or inclusive.

Figure 2:
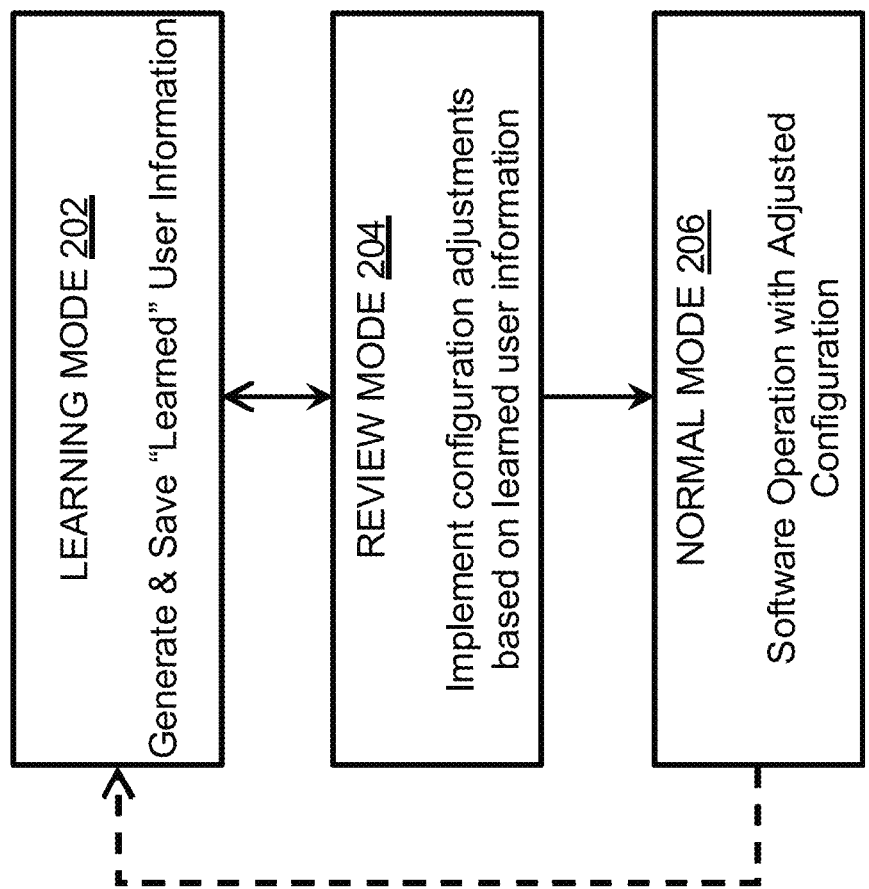
FIG. 2 illustrates an exemplary process flow for automated customization of software configurations.

FIG. 2 illustrates an exemplary process flow 200 for automated customization of software configurations.

Process 200 starts at step 202, the computer system 100 may generate and save user information corresponding to the software features the user requested for execution.

A possible feature of step 202 is, that step 202 may begin when the computer system 100 recognizes that an user is using a specific set of features of a software for the first time. The computer system 100 may execute a set of instructions to track and recognize that the specific user is new to the specific set of features of a software product, for example, by recording and tracking specific users' software features usage in data log files. If the computer system 100 recognizes that the user is new to the features that the user is requesting for execution, then the computer system 100 interrupts execution of the software features being requested, and executes instructions to enter into a Learning Mode, at step 202.

A possible feature is that the computer system 100 executes instructions to record all of the features of a software used by the user as a data log file.

Another possible feature is, that the computer system 100 executes instructions to compare the data log file of a user against the features corresponding to the software code portion currently requested by the user for execution.

Another possible feature is, that if a specific user's data log files do not contain any entries of features that matches the features the user is requesting for execution on the computer system 100, then the computer system 100 recognizes that the user is new to the requested features.

Another possible feature is that the computer system 100 may also track users' feature usage to include the versions of the software features. If the software has been updated since the user's last use, and the software now includes a newer version of a software feature that the user is requesting for execution, a specific user's data log files would not contain any entries of the version of the feature that matches the newer version of features the user is requesting for execution on the computer system 100, then the computer system 100 recognizes that the user is new to the requested features. This would allow the users to perform additional customization of software configurations when software is updated to include newer features.

As illustrated in an exemplary view 300 of a Learning Mode in FIG. 3, the computer system 100 may notify the user, for example in view 300, a list or a table of user information, for example as feature settings, and prompt the user to adjust the user information.

Another possible feature is that the computer system 100 may display a questionnaire with detailed step by step explanations to guide the user to adjust the user information. This would allow the user to adjust the user information in the most appropriate manner.

Another possible feature is that the computer system 100 may perform setting consistency checks after the user adjusts the user information, and alerts the user if there are inconsistencies or conflicts in the user information that would affect the configurations.

Another possible feature is that the computer system 100 may notify the user that some user information are mandatory for the operation of the software features being requested, for example in Screen A. Thus, the computer system 100 may determine to not allow the user to exit the Learning Mode unless all of the mandatory user information are adjusted or set. When all of the mandatory user information are adjusted or set, the computer system 100 may allow the user to access to the requested software features with the set mandatory user information, in a First-Time Access. The computer system 100 may also set other non-mandatory user information with one or more sets of pre-configured user information. This First-Time Access may be using a limited access or sample or test scenario data for the requested software features. The computer system 100 then tracks all of the features and controls that the user interacted with on screen, to further generate or modify the user information.

Another possible feature is that the computer system 100 may allow the user to access the requested software features with one or more sets of pre-configured user information. These sets of pre-configured user information may include configurations generated previously by other users, which may be stored on the system or downloaded from the network, from within the same business entity, the same business department, or shared from other business entities. This access may be in a limited access mode.

Another possible feature is that the computer system 100 may allow the user to access the requested software features with one or more sets of pre-configured user information, and then allow the user to adjust the user information. These sets of pre-configured user information may include configurations generated previously by other users, which may be stored on the system or downloaded from the network, from within the same business entity, the same business department, or shared from other business entities. This access may be in a limited access mode.

Another possible feature is that the computer system 100 may periodically save the user information of the requested software features.

Another possible feature is that the computer system 100 may save the user information of the requested software features upon a user command.

Another possible feature is that the computer system 100 may save multiple sets of the user information of the requested software features.

At step 202, upon a user selection or command, the computer system 100 exits step 202, and proceeds to step 204.

At step 204, the computer system 100 may implement configuration adjustments based on learned or saved user information.

As illustrated in an exemplary view 400 of a Review Mode in FIG. 4, the computer system 100 may notify the user of a list or a table of user information, for example as feature settings, as the computer system 100 generated in the Learning Mode, and prompt the user to confirm.

If the user confirms the settings are correct, then the computer system 100 implements the configuration adjustments for the software features requested by the user, exits the Review Mode, and enters the Normal Mode to execute the requested software features with the implemented configuration adjustments.

However, if the user determines that additional changes in the configurations are needed, then upon a user selection or command, the computer system 100 may exit the Review Mode, and return to the Learning Mode.

At step 204, upon a user selection or command, the computer system 100 exits step 204, and proceeds to step 206.

At step 206, the computer system 100 executes the user requested software features with the adjusted configuration based on learned or saved user information.

Figure 5:
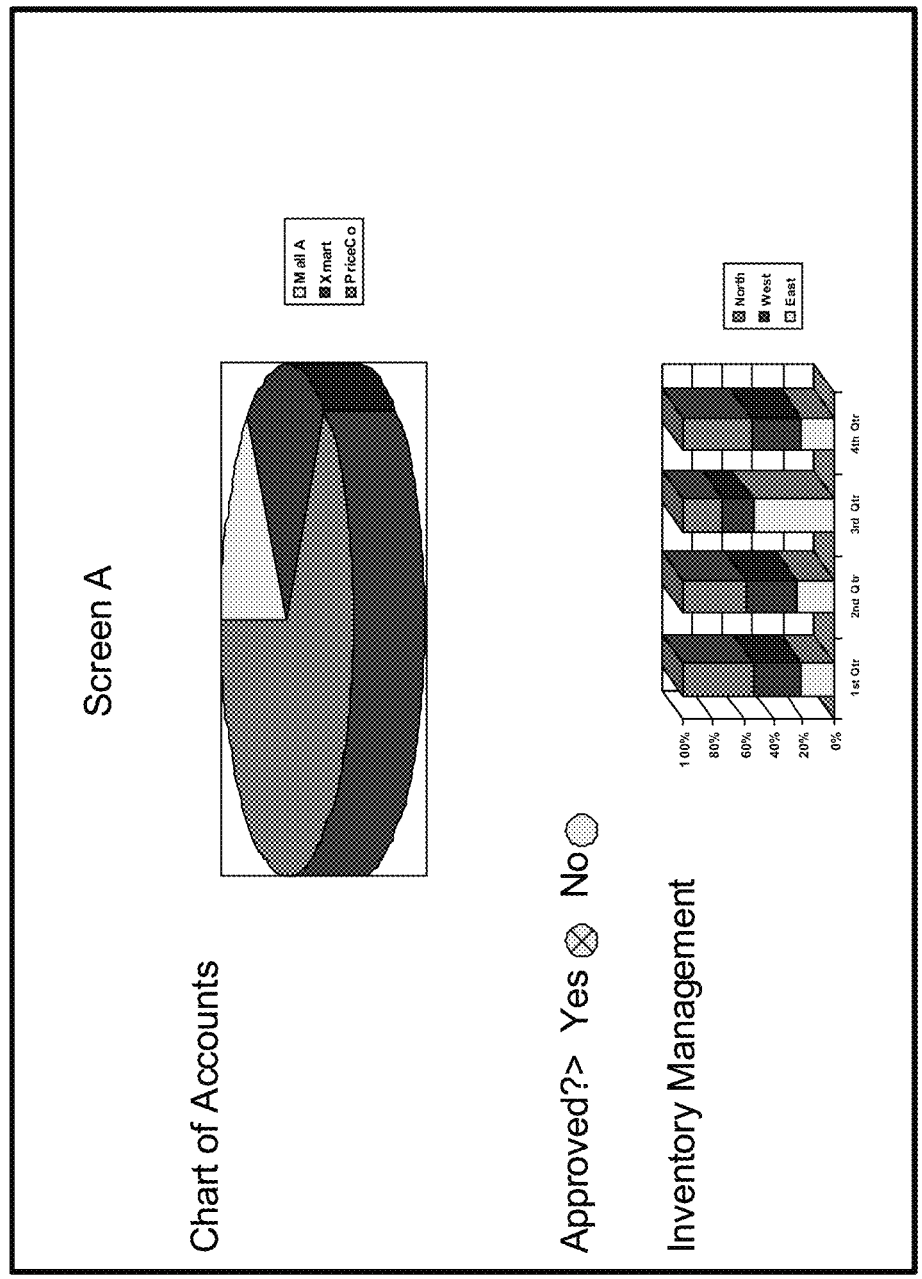
FIG. 5 illustrates an exemplary view of a normal mode.

As illustrated in an exemplary view 500 of a Normal Mode in FIG. 5, the computer system 100 may display the features, for example, "Chart of Accounts", "Approved?", and "Inventory Management", as configured by the user in the Learning Mode.

However, if the user determines that additional changes in the configurations are needed, then upon a user selection or command, the computer system 100 may exit the Normal Mode, and return to the Learning Mode.

At step 206, upon a user selection or command, the computer system 100 may exit step 206, and proceed to step 202.

It is appreciated that the disclosure is not limited to the described embodiments, and that any number of scenarios and embodiments may exist.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of customization of software configuration in a computer system, comprising:
    determining, by a processor, an initial access by a user of a plurality of software features in the computer system, the initial access being determined by checking data logs of the user that contain record of the plurality of software features used by the user, the record comprising the versions of the software features;
    generating, by the processor, a request to a user for entry of information;
    responsive to the user entry of information in reply to the request, generating, by the processor, user preferences corresponding to the plurality of software features;
    notifying the user of the user preferences;
    prompting the user to confirm the user preferences;
    in response to a confirmation from the user, saving, in a memory, the user preferences;
    implementing, in the memory, adjustments to configurations of the plurality of the software features based on the saved user preferences; and
    on a subsequent access of at least one of the plurality of software features by the user, executing, by the processor, the at least one of the plurality of software features according to the implemented adjustments to the configurations of the plurality of the software features.

2. The method of claim 1, wherein the processor prevents the user from accessing the plurality of the software features responsive to the determination that an attempted access of the user is the initial access.

3. The method of claim 1, wherein the processor performs consistency checks on the user information to determine conflicts in the user preferences with respect to configurations of the plurality of the software features.

4. The method of claim 3, wherein the computer system alerts the user if inconsistencies exist in the user preferences which affect implementing adjustments to the configurations.

5. The method of claim 3, wherein the computer system prevents the user from accessing the plurality of the software features if inconsistencies exist in the user information preferences.

6. The method of claim 1, wherein at least one of the plurality of the software features is a mandatory software feature for which the user has to express the user's preference before the computer system allows the user to access the plurality of the software features.

7. The method of claim 1, wherein the computer system allows the user to have access to the plurality of the software features according to a plurality of pre-configured user preferences of the plurality of the software features, and wherein the pre-configured user preferences are configurations generated by other users stored on the computer system.

8. A non-transitory computer-readable medium storing instructions executed by the computer system to perform the method of claim 1.

9. The method of claim 1, further comprising compiling, prior to the determining, data logs of the user using a pre-configured user information to access and use software features other than the plurality of the software features.

10. The method of claim 1, wherein prior to the initial access by the user, the processor has already provided user access to software features other than the plurality of the software features using a pre-configured user information.

11. A computer system to customize software configuration, comprising:
a processor to:
determine an initial access by a user of a plurality of software features in the computer system, the initial access being determined by checking data logs of the user that contain records of the plurality of software features used by the user, the record comprising the versions of the software features;
generate a request to a user for entry of information;
responsive to the user entry of information in reply to the request, generate user preferences corresponding to the plurality of the software features;
notify the user of the user preferences;
prompt the user to confirm the user preferences; and
a memory to save the user preferences in response to a confirmation from the user;
wherein the processor implements adjustments to configurations of the plurality of the software features based on the saved user preferences, and
wherein on a subsequent access of at least one of the plurality of software features by the user, the processor executes the at least one of the plurality of software features according to the implemented adjustments to the configurations of the plurality of the software features.

12. The computer system of claim 11, wherein the processor prevents the user from accessing the plurality of the software features responsive to the determination that an attempted access of the user is the initial access.

13. The computer system of claim 11, wherein the processor performs consistency checks on the user information to determine conflicts in the user preferences with respect to configurations of the plurality of the software features.

14. The computer system of claim 13, wherein the computer system alerts the user if inconsistencies exists in the user preferences which affect implementing adjustments to the configurations.

15. The computer system of claim 13, wherein the computer system prevents the user from accessing the plurality of the software features if inconsistencies exist in the user preferences.

16. The computer system of claim 11, wherein at least one of the plurality of the software features is a mandatory software feature for which the user has to express the user's preference before the computer system allows the user to access the plurality of the software features.

17. The computer system of claim 11, wherein the computer system allows the user to have access to the plurality of the software features according to a plurality of pre-configured user preferences of the plurality of the software features, and wherein the pre-configured user preferences are configurations generated by other users stored on the computer system.

18. The computer system of claim 11, wherein prior to the initial access by the user, the processor has already provided user access to software features other than the plurality of the software features using a pre-configured user information.

19. The computer system of claim 11, wherein a processor displays a questionnaire with explanations to guide the user to adjust the user information.

20. A method of customization of software configuration in a computer system, comprising:
determining, by a processor, an initial access by a user of a plurality of software features in the computer system, the initial access being determined by checking data logs of the user that contain record of the plurality of software features used by the user;
preventing the user from accessing the plurality of software features in response to the determination that an attempted access of the user is the initial access;
displaying a questionnaire with explanations to guide the user to adjust the user information;
responsive to the user entry of information, generating, by the processor, user preferences corresponding to the plurality of software features;
performing, by the processor, consistency checks on the user information to determine conflicts in the user preferences with respect to configurations of the plurality of the software features;
saving, in a memory, the user preferences;
implementing, in the memory, adjustments to configurations of the plurality of the software features based on the saved user preferences; and
on a subsequent access of at least one of the plurality of software features by the user, executing, by the processor, the at least one of the plurality of software features according to the implemented adjustments to the configurations of the plurality of the software features.

* * * * *